US012695932B2

(12) United States Patent
Carney Landow

(10) Patent No.: US 12,695,932 B2
(45) Date of Patent: *Jul. 28, 2026

(54) VIEWER-SPECIFIC CONTENT REPLACEMENT

(71) Applicant: DISH Network L.L.C., Englewood, CO (US)

(72) Inventor: Kate Megan Carney Landow, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,007

(22) Filed: Oct. 17, 2024

(65) Prior Publication Data

US 2025/0039487 A1     Jan. 30, 2025

Related U.S. Application Data

(63) Continuation of application No. 18/146,729, filed on Dec. 27, 2022, now Pat. No. 12,149,766.

(51) Int. Cl.

| | |
|---|---|
| *H04N 21/2668* | (2011.01) |
| *H04N 21/234* | (2011.01) |
| *H04N 21/235* | (2011.01) |
| *H04N 21/258* | (2011.01) |
| *H04N 21/437* | (2011.01) |
| *H04N 21/845* | (2011.01) |

(52) U.S. Cl.
CPC ... *H04N 21/2668* (2013.01); *H04N 21/23424* (2013.01); *H04N 21/2353* (2013.01); *H04N 21/25816* (2013.01); *H04N 21/437* (2013.01); *H04N 21/8455* (2013.01)

(58) Field of Classification Search
CPC ......... H04N 21/2668; H04N 21/23424; H04N 21/2353; H04N 21/25816; H04N 21/437; H04N 21/8455
See application file for complete search history.

(56) References Cited

U.S. PATENT DOCUMENTS

| | | | |
|---|---|---|---|
| 9,571,872 B2 | 2/2017 | Landow | |
| 2005/0039205 A1 | 2/2005 | Riedl | |
| 2008/0148336 A1 | 6/2008 | Walter et al. | |
| 2008/0201731 A1* | 8/2008 | Howcroft | H04H 9/00 |
| 2009/0280909 A1* | 11/2009 | McEniry | A63F 9/24 |
| 2016/0345078 A1 | 11/2016 | Landow | |
| 2020/0193389 A1 | 6/2020 | Lagares-Greenblatt et al. | |
| 2021/0120277 A1 | 4/2021 | Nonnenmacher | |
| 2022/0368855 A1 | 11/2022 | McBride et al. | |

* cited by examiner

*Primary Examiner* — Anthony Bantamoi
(74) *Attorney, Agent, or Firm* — KW Law, LLP

(57) ABSTRACT

Processes, systems, and devices create personalize content for users. A virtual meeting room can be hosted and can include content for a user account authenticated to a user device. Replacement content may be selected by comparing metadata of replacement content with metadata generated in response to a previous meeting with the user account. A segment in the content is replaced with the replacement content to generate personalized content. The personalized content including the selected replacement content is sent to the user device. The replacement content can include content related to a previously diagnosed condition of a user associated with the user account. The replaceable segment in the content comprises content for display in a waiting room of the virtual meeting room.

20 Claims, 4 Drawing Sheets

400

Authenticate user device to system supporting virtual meeting — 402

Establish connection between user device and virtual room — 404

Identify replaceable segments of content in virtual room — 406

Select replacement content based on metadata of authenticated user — 408

Replace identified replaceable content with selected replacement content — 410

Transmit personalized content to device connected to virtual room — 412

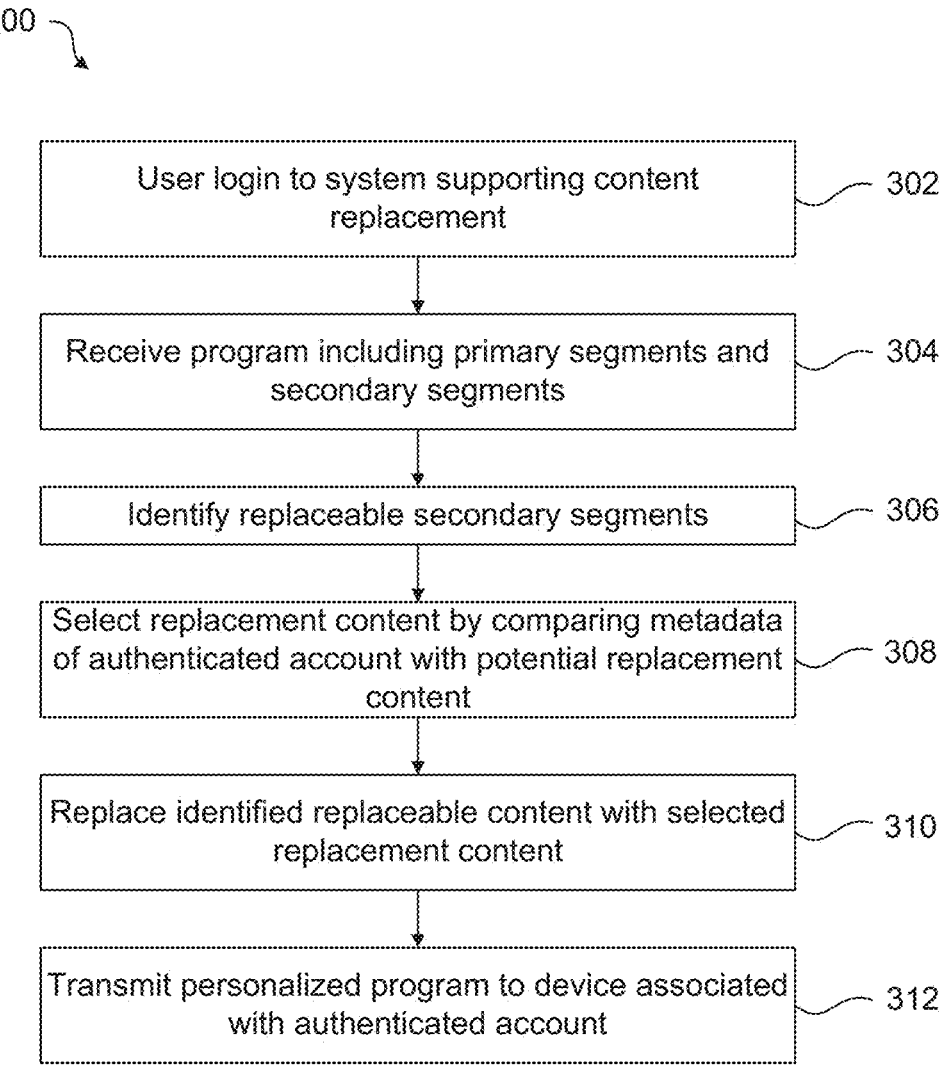

300

User login to system supporting content replacement — 302

Receive program including primary segments and secondary segments — 304

Identify replaceable secondary segments — 306

Select replacement content by comparing metadata of authenticated account with potential replacement content — 308

Replace identified replaceable content with selected replacement content — 310

Transmit personalized program to device associated with authenticated account — 312

FIG. 3

VIEWER-SPECIFIC CONTENT REPLACEMENT

PRIORITY CLAIM

This application claims priority to U.S. patent application Ser. No. 18/146,729 filed on Dec. 27, 2022 and entitled "VIEWER-SPECIFIC CONTENT REPLACEMENT," which is incorporated herein by reference.

TECHNICAL FIELD

The following relates generally to systems, devices or automated processes relating to processing digital video content. More particularly, embodiments of the subject matter relate intelligently replacing certain segments of a video program with different video content that is specific to a particular viewer of the video content.

BACKGROUND

Many consumers of video content receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded video programming data is sent via a cable or wireless data link to the viewer's home, where the video data is ultimately decoded by the STB. The decoded signals can then be viewed on a television or other appropriate display as desired by the viewer. Additionally, streaming and on-demand video can be provided via the Internet, mobile networks, or the like. In this regard, video content can be delivered from a content server to a user device (e.g., a personal computer, a smartphone device, a tablet device) upon request by the user.

Although a video program such as a movie or a television show can be broadcast or otherwise presented in an uninterrupted manner, in many cases the program is divided into shorter segments that are separated by segments of secondary content (also referred to herein as interstitial content). In practice, the secondary video content is different than the primary video program content, and it can include previews of other video programs, promotional content, commercials, etc.

This secondary content is often replaceable. Sometimes a source will transmit the content with audio cues that indicate where a replacement slot begins and ends. The replacement content is typically selected based on general data. For example, an ad for a sporting event that has already occurred might be replaced with an ad for future programming based on the air date for each ad. However, the viewer may not be interested in the future programming advertised in the replacement ad.

BRIEF DESCRIPTION

Various embodiments relate to different automated processes, computing systems, devices and other aspects of a data processing system that personalize content. Some embodiments include an automated process for delivering personalized content. The automated process includes the step of authenticating a user device associated with a user account with a system supporting content replacement. A replaceable segment is identified in the content, and replacement content is selected by comparing metadata associated with the user account to metadata associated with potential replacement content. The process includes replacing the replaceable segment in the content with the selected replacement content to generate personalized content for the user account and transmitting the personalized content including the selected replacement content to the user device. Other embodiments of this aspect include corresponding computer systems, apparatus, and computer programs recorded on one or more computer storage devices, each configured to perform the actions of the methods.

In various embodiments, the automated process may include receiving the content from a content delivery network. The content may include a primary segment and a secondary segment, where a cue indicates the secondary segment is replaceable. The user device requests the replacement content in response to detecting the cue. The replaceable segment in the content may include content for display in a waiting room of a virtual meeting. The replacement content is selected in response to a unique identifier of the replacement content being associated with the user account. Authenticating the user device may include receiving a request from the user device to join a virtual meeting. The user device sends the request to join the virtual meeting in response to a unique link. Implementations of the described techniques may include hardware, a method or process, or computer software on a computer-accessible medium.

Another embodiment of an automated process for delivering personalized content includes receiving content having a primary segment and a secondary segment. A user device associated with a user account is authenticated, and the user device is configured to receive the content. The process includes identifying the secondary segment as a replaceable segment of the content, selecting replacement content by comparing metadata associated with the user account to metadata associated with potential replacement content, and replacing the replaceable segment in the content with the selected replacement content to generate personalized content for the user account. The personalized content is transmitted to the user device.

In various embodiments, a content delivery network transmits the personalized content to the user device. The content may include a cue indicating the secondary segment is replaceable. The user device requests the replacement content in response to detecting the cue. The replaceable segment in the content may include an advertisement included in an original broadcast of the content. The replacement content is selected in response to a unique identifier of the replacement content being associated with the user account. Authenticating the user device may include logging into the user account using the user device.

An embodiment of an automated process for personalizing content in virtual meetings includes connecting a user device associated with a user account to a meeting room. A replaceable segment of the content is identified in the meeting room. Replacement content is selected by comparing metadata associated with the user account to metadata associated with potential replacement content. The process further includes replacing the replaceable segment with the selected replacement content to generate personalized content for the user account and transmitting the personalized content including the selected replacement content to the user device.

In various embodiments, the replaceable segment is identified in response to the replaceable content being generic content for display in waiting rooms. The replacement content is selected in response to a unique identifier of the replacement content being associated with the user account. The automated process may include authenticating the user device in response to receiving a request from the user device to join a virtual meeting. The user device sends the request to join the virtual meeting in response to a unique link.

Other embodiments could relate to systems for establishing and continuing communications through secure connectionless constructs that encapsulate secure media content. Still other embodiments could relate to server or client devices that are configured to communicate using secure connectionless constructs that encapsulate secure media content. Other devices, systems and automated processes may be formulated in additional to those described in this brief summary section.

DRAWING FIGURES

FIG. 3 illustrates an example process for personalizing broadcast content, in accordance with various embodiments.

DETAILED DESCRIPTION

Figure 1:
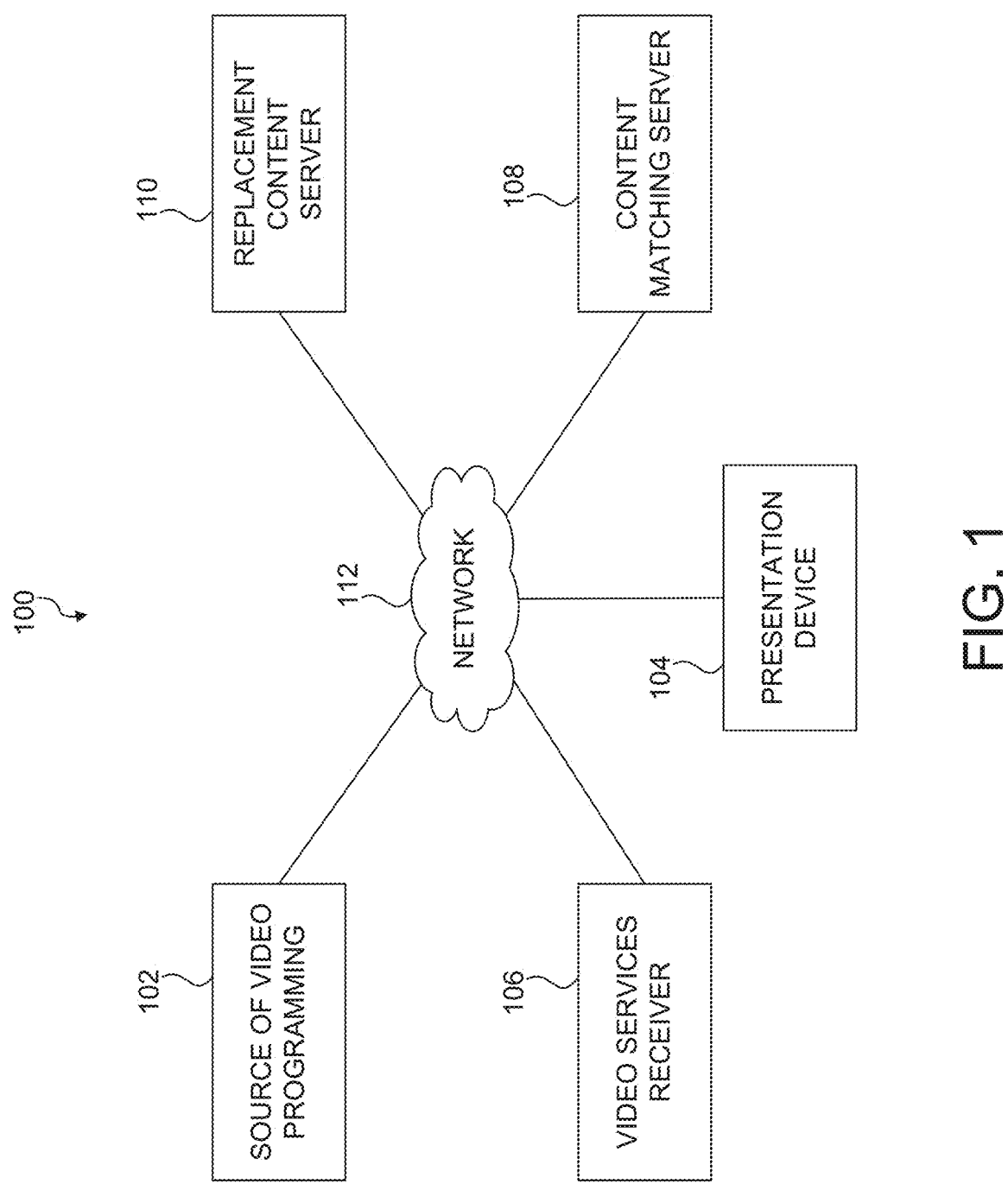
FIG. 1 illustrates an example of a system for personalizing content, in accordance with various embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like. The software that performs the described functionality may reside and execute at a host device, such as a video services receiver, a mobile device, or a home entertainment component, or it may be distributed for execution across a plurality of physically distinct devices, systems, or components, as appropriate for the particular embodiment.

The following description relates to a video delivery system that is configured to process audio/visual content for presentation to a user. Although the following description focuses on video content conveyed in a video stream, the subject matter may also be utilized to handle audio content conveyed in an audio stream, such as a broadcast radio program, a streaming music channel, or the like. The content is personalized to particular users and delivered in a unicast or semi-unicast format. As used herein, the term unicast means personalized content transmitted to a specific user. Similarly, the term semi-unicast means personalized content transmitted to a group of users sharing a characteristic related to the personalization.

The exemplary embodiments described below relate to a video delivery system such as a satellite television system, a cable delivery system, an Internet-based streaming content delivery system, a cellular network delivery system, or the like. The disclosed subject matter relates to a system and related methodologies for processing an original version of video programming that includes primary video content and secondary video content (e.g., interstitial content, commercials, advertisements, marketing segments, or content gaps). The processing is intended to identify personalized content that can be used to replace at least some of the secondary video content.

For example, a stream of primary and secondary content may be delivered to a user that opts-in to personalized content related to their virtual physical therapy session. The disclosed system determines or identifies personalized segments to replace the secondary video content segments contained in the stream. Continuing the example, the system replaces a secondary content segment with a reminder to perform lunges and hamstring stretches in support of the user's recovery from a knee injury. The exemplary embodiment of the system described here may leverage program metadata that identifies the replacement secondary video content. The program metadata can be reviewed to determine personalized replacement video content that "matches" the particular user consuming the stream.

FIG. 1 is a block diagram that illustrates an exemplary embodiment of a video services system 100 that is configured to support the techniques and methodologies described in more detail below. It should be appreciated that the block diagram shown in FIG. 1 represents a simplified version of the system 100, for ease of description and clarity. A practical implementation of the system 100 will typically include additional components and functionality that need not be shown or described here.

The system 100 generally includes, without limitation: at least one source of video programming 102 (referred to in the singular form herein for the sake of convenience); a presentation device 104; a video services receiver 106 or other form of customer equipment that is capable of receiving, processing, and rendering video content; a computer-implemented content matching server 108 that is programmed and operated to perform content characterization and matching in the manner described in more detail below;

and a computer-implemented server system 110 that is programmed and operated to maintain secondary video content that can be accessed by, or delivered to, client devices or systems on demand. The main components of the system 100 are depicted as remotely located computing devices in FIG. 1. In certain embodiments, however, a plurality of the system components can be physically located in the same facility. Moreover, a plurality of the system components can be implemented together in a single piece of computer-based hardware if so desired (for example, the content matching server 108 and the server system 110 can be implemented together as two functional modules of one hardware system). In some embodiments, presentation device 104 may perform content matching and customization to for delivery to the user of presentation device 104. In that regard, presentation device 104 may host replacement content server 110 or matching server 108 in various embodiments.

In certain embodiments, the source of video programming 102, the presentation device 104, the video services receiver 106, the content matching server 108, and the server system 110 communicate using a data communication network 112. For the sake of brevity, conventional techniques related to satellite, cable, and Internet-based communication systems, video broadcasting systems, data transmission, signaling, cellular networks, network control, and other functional aspects of the systems (and the individual operating components of the systems) may not be described in detail herein. The data communication network 112 is any digital or other communications network capable of transmitting signals, data, or messages between senders and receivers within the system 100. In various embodiments, the network 112 includes any number of public or private data connections, links or networks supporting any number of communications protocols. The network 112 may include the Internet, for example, or any other network based upon TCP/IP or other conventional protocols. In various embodiments, the network 112 also incorporates a wireless or wired telephone network, such as a cellular communications network for communicating with mobile phones (including, but not limited to, 5G networks), personal digital assistants, or the like. The network 112 may also incorporate any sort of wireless or wired local area networks, such as one or more IEEE 802.3 or IEEE 802.11 networks.

The system 100 may include or cooperate with one or multiple sources of video programming 102; FIG. 1 and this description refer to only one source of video programming 102 for the sake of simplicity. Moreover, a given video services provider (e.g., a satellite video provider, a cable television provider, a telecommunication services provider, or the like) could maintain, provide, or otherwise cooperate with one or multiple sources of video programming 102 designed to support any number of subscribers.

In certain embodiments, the source of video programming 102 may be deployed as a head end facility or a satellite uplink facility for the system 100. In some embodiments, the source of video programming 102 may include or cooperate with one or more web-based content delivery applications, services, or providers. The source of video programming 102 generally functions to control content, signaling data, programming information, and other data sent to any number of receiving components. In practice, the source of video programming 102 may also provide content and data that can be used to populate an interactive electronic program guide (EPG) generated by the video services receiver 106.

The source of video programming 102 includes one or more data processing systems or architectures that are capable of producing signals that are transmitted to customer premise equipment, mobile devices, computer systems, or the like. In various embodiments, the source of video programming 102 represents a satellite, cable, or other content distribution center having: a data control system for controlling content, signaling information, blackout information, programming information, and other data; and a control system for transmitting content, signaling information, blackout information, programming information, and other data using high-bandwidth links. These systems may be geographically, physically or logically arranged in any manner, with data control and uplink control being combined or separated as desired.

Each presentation device 104 supported by the system 100 may be configured to perform at least the following functions: playing locally stored video content; playing streaming media content; playing replacement video segments; and other routine or conventional functions that may be less important in the context of this description. Presentation device 104 may also be configured to support the recording and saving of video events. In this regard, a presentation device 104 can be realized as a devoted DVR device, a remote (e.g., cloud-based) DVR system, a smartphone, a tablet, or as another piece of hardware that incorporates video recorder functionality. In typical deployments, the presentation device 104 can be implemented as a standalone DVR device, a set top box, a smart television set, a streaming media appliance, or any piece of hardware that receives and handles video content that is broadcast or otherwise delivered by a video service provider. In certain embodiments, a presentation device 104 or its functionality as described herein can be realized with: a personal computer (e.g., a laptop, desktop, tablet, or other form factor); a mobile phone; a personal media player; a video game console or device; a vehicle-based entertainment system; or the like. In this regard, the methodologies described here can also be utilized with a presentation device 104 that lacks video recording functionality, as long as the device is capable of processing and playing video events (e.g., a saved video file, streaming video content, broadcast video content).

In accordance with an exemplary use case, the presentation device 104 handles video events in a conventional manner. In accordance with certain embodiments, video content received and processed by the presentation device 104 may be formatted in compliance with one of the MPEG encoding standards, such as MPEG-2 or MPEG-4, as may be used in DBS systems, MPEG-DASH for use with streaming applications, terrestrial Advanced Television Systems Committee (ATSC) systems or cable systems. However, different audio and video data formats and encoding schemes may be utilized in other implementations.

The video services receiver 106 represents one exemplary embodiment of a video presentation system, device, component, or module that is suitable for use in the system 100. The video services receiver 106 can be realized as any device, system or logic capable of receiving signals from the source of video programming 102. Accordingly, the video services receiver 106 may include a receiver interface to receive data associated with video services, including any number of video events that are provided by various video providers. More specifically, the video services receiver 106 is suitably configured to receive original versions of video programming from the source of video programming 102. In accordance with certain embodiments, the receiver interface may also be utilized to access and receive secondary video content from the server system 110.

To support traditional video delivery functions, the video services receiver 106 is capable of providing demodulated content to a customer via an associated display element (not shown in FIG. 1). Accordingly, the video services receiver 106 may include a suitable display interface for the display, where the display interface facilitates presentation of video and image content on the display. In various embodiments, the video services receiver 106 is implemented as a set-top box (STB) as commonly used with digital video broadcasting, satellite, or cable television distribution systems. In other embodiments, however, the functionality of the video services receiver 106 may be commonly housed within the display element itself. In still other embodiments, the video services receiver 106 a portable device that may be transportable with or without a display. The video services receiver 106 may also be suitably configured to support broadcast television reception, video game playing, personal video recording or other features as desired.

During typical operation, the video services receiver 106 receives video programming (broadcast events, on-demand video events, streaming media, emergency broadcasts, etc.), signaling information, or other data via the network 112. The video services receiver 106 then demodulates, decompresses, descrambles, or otherwise processes the received digital data, and then converts the received data to formatted video signals that can be rendered for viewing by the customer on the associated display or on the presentation device 104. The video services receiver 106 may also be capable of receiving web-based content via the network 112, the Internet, etc., and may also be capable of recording and playing back video content. In certain scenarios, the video services receiver 106 can be utilized as a playback system for digital media files (e.g., streaming media content) that convey recorded versions of original video program events. For example, an end user device (e.g., the presentation device 104) could be used to download and present a video clip posted on the Internet (e.g., using the well-known YOUTUBE video sharing service), where the video clip is a recorded version of a show that has already been broadcast.

The video services receiver 106 may include digital video recorder functionality that supports conventional video recording, storage, and playback features. Accordingly, the video services receiver 106 may include or cooperate with flash memory, a hard disk, a removable disk, or any other form of storage medium known in the art that can store recorded video content.

The content matching server 108 represents the hardware, software, processing logic, and architecture associated with one or more content characterization and matching services, providers, or platforms. The content matching server 108 may include or cooperate with a database system that maintains, organizes, and provides data used in association with the content matching server 108. In this regard, the data maintained, processed, and managed by an exemplary embodiment of the content matching server 108 includes at least one database object for each video event of interest (e.g., potential replacement content segments). In an exemplary embodiment, a database object for a secondary content segment may include the following information, without limitation: a program or object identifier that uniquely identifies the video content; a title or episode name of the video event; a series title or name corresponding to the video event; an episode number or identifier; a season number or identifier; a genre or general content descriptor; a parental rating or guideline identifier; an age identifier or category that indicates a recommended or appropriate age group for the video event; a publisher, producer, or content originator; a broadcast network identifier; a channel or video service identifier; runtime indicators (which may identify the total runtime or the runtimes for each segment of the video event of interest); time/date stamp information related to a broadcast or presentation time of the video event; and descriptive data (metadata) that characterizes the video content.

Various embodiments include descriptive metadata used to match content to particular users. For example, a secondary content segment for delivery to users enrolled in physical therapy for a knee injury might by tagged with terms such as "physical therapy," "knee injury," "rehabilitation," "lunges," and "hamstring stretches." The metadata may also identify a service provider or office (e.g., the treating therapist). A user may match the secondary content when the user account includes one or more of the same or similar metadata tags.

In certain embodiments, a database object for a video event may include information (e.g., information provided by content providers) that relies on social contributions to describe or rate the material. In this regard, some of the descriptive information can be mutable, and very specific to segment. As an example, a reminder to perform physical therapy exercises may be rated by users in physical therapy who receive a personalized stream including the reminder as secondary content. Highly rated secondary content may be delivered to other similar users.

Content matching server 108 maintains, manages, and processes data that is linked to (or otherwise associated with) the secondary video content of interest and in some embodiments the primary content being consumed. For any given piece of video content, the corresponding data can be linked to the program identifier that uniquely identifies the piece of video content. Thus, an amount of descriptive/characterizing data can be uniquely linked to a piece of video content by way of its unique program identifier or primary key.

In various embodiments, descriptive data for video content may include some or all of the following, without limitation: a genre, category, or classification; a parental rating; an intended audience identifier; an age identifier or category that indicates a recommended or appropriate age group for the video content; a social behavior identifier or category that indicates certain types of behavior demonstrated in the video content, e.g., smoking, drinking alcohol, drug use, etc.; a gender or sexual orientation identifier or category that indicates a recommended or appropriate gender or sexual orientation for the video content; an ethnic identifier or category that indicates a recommended or appropriate ethnic group for the video content; a nationality identifier or category that indicates a recommended or appropriate nationality group for the video content; a political identifier or category that indicates a recommended or appropriate political group for the video content; a cultural identifier or category that indicates a recommended or appropriate cultural group for the video content; an interest identifier or category that indicates a recommended or appropriate interest group for the video content; a language identifier or category that indicates a recommended or appropriate language for the video content; tags or keywords that identify scenes, themes, or subject matter of the video content; product or service identifiers associated with advertisements or commercials; manufacturer, vendor, service provider, or company names associated with advertisements or commercials; and the like.

The server system 110 represents the hardware, software, processing logic, and architecture associated with one or more content delivery services, providers, or platforms. The server system 110 may include or cooperate with a database system that maintains, organizes, and provides replacement video content that can be used to replace video segments that appear in an original version of video programming having primary video content and secondary video content. In practice, the server system 110 may be implemented as described above for the source of video programming 102. The server system 110 may be deployed in the context of a content delivery network (CDN) or advertisement server that cooperates with the content matching server 108, the video services receiver 106, the presentation device 104, and the like. Any computing device described herein may also be implemented on cloud computing hardware. For example, source of video programming 102 may be a cellular network partially hosted on cloud computing hardware and in cellular communication with presentation device 104.

In some embodiments, secondary video content is maintained and managed by server system 110 can be uniquely identified with corresponding program identifiers. Alternatively or additionally, there can be coordination with the presentation device 104 or with the video services receiver 106 to narrow the targeting and to improve the manner in which the secondary video content is selected. This allows content matching server 108 to coordinate with server system 110 to identify personalized secondary video content to be used as replacement content and served to a destination device within the system 100. As mentioned above, the features and functionality of the server systems 108, 110 can be combined for deployment in a common hardware device or system if so desired.

Although not separately depicted in FIG. 1, the video services receiver 106, the source of video programming 102, or another component in the system 100 may include video place-shifting functionality, or it may cooperate with a suitably configured place-shifting device or component to place-shift video content. In this regard, it may be possible to provide live or recorded content to a remote device operated by the user (such as the presentation device 104), wherein the video services receiver 106, the source of video programming 102, or another component in the system 100 serves as a source of the place-shifted content.

Moreover, the video services receiver 106, the presentation device 104, or other devices operating in the system 100 may include any number of native video processing and rendering features and functions. In this regard, the video services receiver 106, the presentation device 104, or other devices in the system 100 can be suitably configured to perform the video presentation functions described in more detail herein.

The source of video programming 102, the presentation device 104, the video services receiver 106, the content matching server 108, and the server system 110 can be implemented as (or can be integrated with) an electronic processor-based component. Regardless of its form factor and hardware platform, a processor-based or computer-implemented device deployed in the system can be configured to support the desired features and functions using the appropriate hardware, software, firmware, etc. For example, a computer-implemented device or system may include, without limitation: a network communication module to interface with the data communication network 112; device-specific hardware, software, firmware, or applications; at least one processor device; and at least one memory element having a suitable amount of storage capacity. The memory element can include or be realized as a non-transitory computer readable medium that is in electronic communication with the processor, wherein the medium stored instructions that are executable by the processor or the host device to perform operations described herein.

The exemplary implementation of the system 100 utilizes program identifiers to uniquely identify video content. More specifically, the primary video content conveyed in video programming is identified by a corresponding program identifier. In certain embodiments, the secondary video content (e.g., advertisements and other interstitial content) conveyed in video programming is also identified by a corresponding program identifier. Although any suitable identification scheme, protocol, or convention can be used in the context of system 100, certain implementations leverage the Entertainment Identifier Registry (EIDR), which is a universal unique identifier system for movie and television assets. Details of the EIDR platform, and a search engine to find EIDR program identifiers, are publicly available at www.eidr.org. Other implementations may include automatic detection of secondary content or identification of secondary content using cues such as those described by the Society of Cable and Telecommunications Engineers (SCTE) in the SCTE-35 standard.

Figure 2:
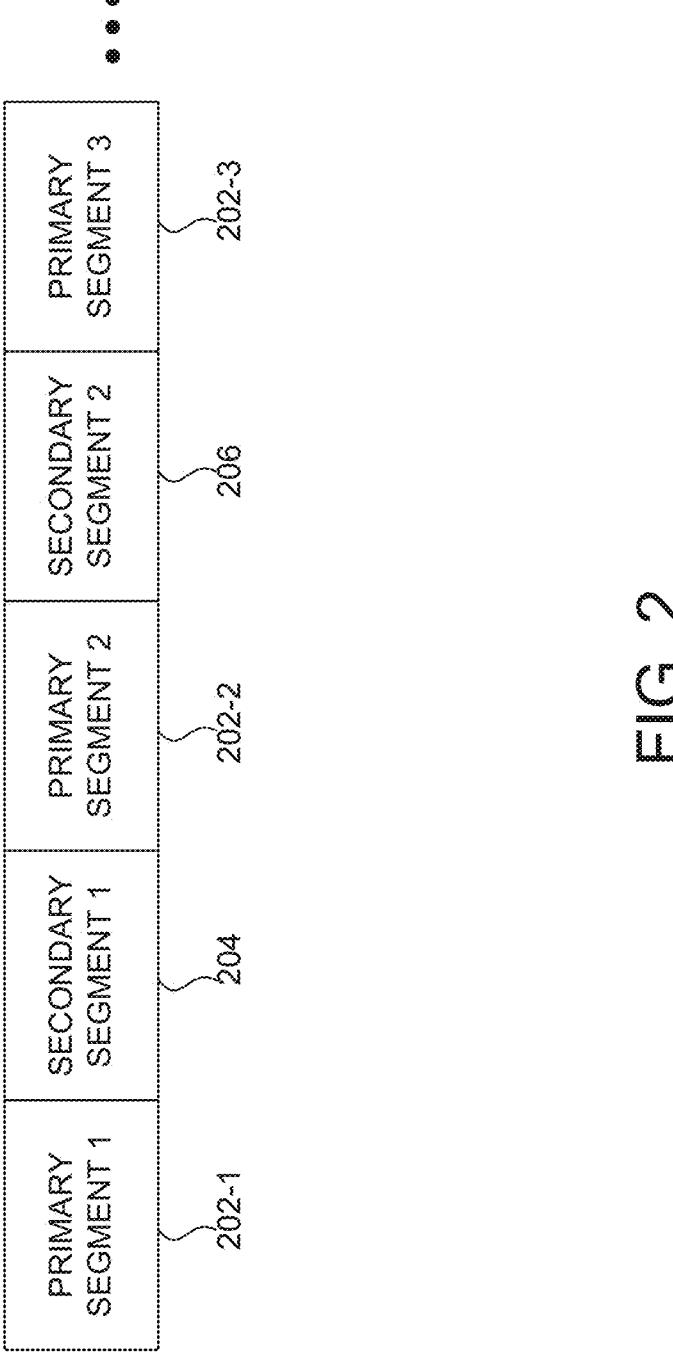
FIG. 2 illustrates an example of original content with replaceable segments, in accordance with various embodiments.

Below describes an example use case, with reference to the video services system 100 shown in FIG. 1 and to the video content 200 of FIG. 2, which shows a schematic representation of a video program 200 having primary video segments interspersed with secondary video segments. The use case follows the exemplary methodology outlined in FIG. 3, which is a flow chart that illustrates an exemplary embodiment of a process 300 for the intelligent replacement of video content segments.

In various embodiments, process 300 represents an exemplary method of operating a video services system of the type described herein. The various tasks performed in connection with the process 300 may be performed by software, hardware, firmware, or any combination thereof. For illustrative purposes, the following description of the process 300 may refer to elements mentioned above in connection with FIG. 1. In practice, portions of the process 300 may be performed by different elements of the described system, e.g., a video services receiver, a client presentation device, a secondary video content server, or a content characterization and matching server. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The example presented here assumes that the various components of the system 100 are already deployed and configured for compatibility with one another to support the described features and functions. To this end, there may be agreement among content producers, video service providers, video delivery system operators, client device manufacturers, client device software developers, video services receiver manufacturers, video services receiver software developers, content delivery networks, etc., with respect to the manner in which video content is identified, the manner in which video content is characterized, tagged, or otherwise classified, and the manner in which secondary video segments that appear in an original version of video programming are replaced with replacement video segments that the system 100 uses to customize the video feed for each particular end user or group of users. Moreover, the example presented here assumes that the content matching server 108 is already populated with a fulsome list of classified, categorized, and characterized secondary video segments, which are linked to their respective program identifiers. The secondary video segments are also associated with descriptive data that characterizes the video content. As mentioned above, secondary video content will be matched to users or groups of users based on corresponding descriptive data.

In accordance with this typical use case, an original version of video programming can be provided by the source of video programming, for presentation by the video services receiver 106 or the presentation device 104. FIG. 2 schematically depicts an original version of video programming 200, which includes a plurality of adjacent segments. Although only five distinct segments are depicted, the ellipses in FIG. 2 indicate that the original version of video programming 200 may contain any number of additional segments. The video programming 200 includes primary video content divided into primary video segments 202, and secondary video content provided in secondary video segments 204, 206. Each secondary video segment 204, 206 may be adjacent a primary video segment 202 or a secondary video segment 204 on either side. Although not always required, the illustrated video programming leads with a first primary video segment 202-1, which is followed by the secondary video segment 204, which is followed by a second primary video segment 202-2, which is followed by the secondary video segment 206, which is followed by a third primary video segment 202-3.

In various embodiments, the primary video content (which includes the primary video segments 202) represents the content to be viewed by the consumer, e.g., a movie, a sporting event, a television show, or a concert. The secondary video content (which includes the secondary video segments 204, 206, and possibly others) represents interstitial, commercial, advertising, promotional, empty segments, or marketing content that is usually presented between two segments of primary video content. One or more secondary segments may be adjacent one another. Replacement content may replace one secondary segment or multiple continuous secondary segments. For example, a two-minute commercial segment comprising four 30 second advertisements may be replaced with a two-minute piece of replacement content. The same two-minute commercial segment could be replaced with one 15 second piece of replacement content and another piece of replacement content running 1 minute and 45 seconds. In that regard, the total secondary segment duration may be replaced with replacement content having a same or similar duration.

The video services system 100 and operating methodologies described here are designed to address scenarios where the secondary video content is replaceable with personalized content for the user logged into a playback device. These scenarios are addressed by determining suitable and appropriate replacement video content that can be presented in place of the originally provided secondary video content that appears in the original version of the video programming 200.

Referring to FIG. 3, process 300 may begin by logging a user account into system 100 supporting content replacement (Block 302). System 100 may login users using traditional authentication techniques. Some embodiments may login users in response to users joining a video service or video meeting room. In that regard, users may login or authenticate in some embodiments without entering the traditional username and password. Programming may be delivered to users authenticated with a content provider or a secondary content replacement service. Authentication can be completed using a username and password, and multi-factor authentication may be implemented for enhanced security. Users may authenticate in person in some embodiments to receive personalized content relevant to a recent in-person or virtual experience. For example, a user may authenticate by checking in for a virtual appointment with a physician using a smartphone. Authentication may be as simple for the user as clicking a link or joining a waiting room from a calendar event.

Embodiments of process 300 may include receiving programming including primary segments and secondary segments (Block 304). Incoming programming 200 may be a broadcast generally available to authenticated users of system 100. Incoming programming 200 may also be publicly available internet programming. Primary segments and secondary segments may be arranged in an order similar to that of programming 200 in FIG. 2, or in any other order. For example, programming 200 may include primary content comprising a television series and secondary content comprising commercials interspersed throughout the primary content.

In various embodiments, system 100 may identify replaceable secondary segments (Block 309). Programming 200 may include indicators where secondary content is replaceable such as, for example, SCTE 35 cues or other indicators. System 100 may also analyze programming 200 by comparing content in programming 200 to known replaceable content to identify replaceable secondary segments.

Some embodiments of system 100 may also select replacement content by comparing metadata of an authenticated account with metadata of potential replacement content (Block 308). Metadata associated with an authenticated account may include programming preferences, program enrollment, viewing preferences, playback device, demographics, or other metadata suitable for identifying replacement content for the account. Metadata may be stored in tags associated with the user account in some embodiments. For example, a user may enroll in personalized content when signing up for a physical therapy appointment. The user account would include metadata indicating the user's request for content related to their physical therapy session. The metadata could include a schedule of exercises and stretches a user should perform at home such as, for example, hamstring stretches, lunges, and quadricep stretches. The metadata may also include in identifier for the physical therapist's office and treating therapist.

Gathering and usage of contextual data for assessing users and content may be implemented in a privacy preserving manner. The unnecessary disclosure of personally identifying information, health information, financial information, or information related to the habits of minors, may be filtered out or omitted from the data collected by presentation device 104, receiver 106, or content matching server 108. For example, content matching server 108 may identify and filter out such information.

Further, rules established in viewing profiles or viewing controls may restrict or limit the collection of data. Parental controls restricting the output of content for display may likewise restrict the collection of contextual data from presentation device 104 or receiver 106 to identifiable data such as viewing durations, channels, content consumed, or other data suitable for restriction by parental controls. Similarly, and regardless of viewer controls, viewer interaction with presentation devices 104 or receivers 106 to browse to websites of pharmaceutical or intimate nature may, to engage in doctor appointments, or other sensitive matters may be filtered out of or omitted from data collection or access. Omitting sensitive information from data collection routines may improve the user experience by reducing the risk that the system 100 will tailor content to products, services, and organizations of a sensitive or private nature, and thereby reduce the risk of viewer embarrassment or exposure of private information. Encryption may be used on communication channels, data storage, user data, personalization data, or transactional data to enhance end user privacy.

System 100 may use metadata associated with a user account to link an authenticated user account to personalized replacement content. Replacement content may be personalized to a particular user and associated user account. Replacement content related to a virtual physician appointment may include, for example, a list of reminders or instructions for medications, a personal message from a doctor, or a video clip of interest based on dietary suggestions. The user may opt into the personalized messages when logging into their virtual appointment, and the doctor or staff may suggest suitable replacement content. System 100 may also automatically select replacement content from a library based on metadata.

Replacement content may be tagged with metadata on creation and introduction to replacement content server 110. Continuing the above physical therapy example, the treating therapist may submit or select content to replacement content server 110 for transmission to patients. Content may be tagged with metadata in a manner similar to user accounts. Metadata associated with potential replacement content may include tags descriptive of content, duration, demographics, suitable program enrollment, suitable program preferences, or other metadata suitable for matching replacement content to an authenticated user account. Potential replacement contents may thus be tagged or otherwise associated with metadata to match user accounts that would be interested in the replacement content. In some embodiments, replacement content may be tagged with a user identifier associated with a particular user account to trigger delivery to the particular account associated with the user identifier.

Various embodiments use characteristics of the replaceable secondary segment as criteria to select replacement content. For example, replacement content may be selected to fill a segment of a predetermined duration (e.g., 15 seconds, 30 seconds, or a minute). Multiple pieces of secondary content may be selected to reach a desired aggregate duration in replacing secondary content.

System 100 may replace the identified replaceable content with the selected replacement content (Block 310) in some embodiments. Content matching server 108, replacement content server 110, source 102, video services receiver 106, or presentation device 104 may perform the replacement. The secondary content identified as replaceable may be overwritten leaving surrounding primary content intact or substantially intact. In some embodiments, video services receiver 106 or presentation device 104 may access selected replacement content and insert into programming beginning at the same time as the secondary content identified as replaceable, though system 100 may also replace the secondary content prior to delivery to video services receiver 106 or presentation device 104.

Various embodiments of system 100 transmit the personalized program to the device associated with the authenticated user account (Block 312). The personalized program includes the selected replacement content in lieu of at least some secondary content identified as replaceable. Some embodiments may include selected replacement content prepended to the beginning of primary content on concatenated to the end of the primary content. Transmission may be a unicast or semi-unicast transmission to a particular playback device or a group of playback devices. For example, transmission may be made from a content delivery network to a specific user device over a cellular network providing a data connection to the Internet.

Figure 4:
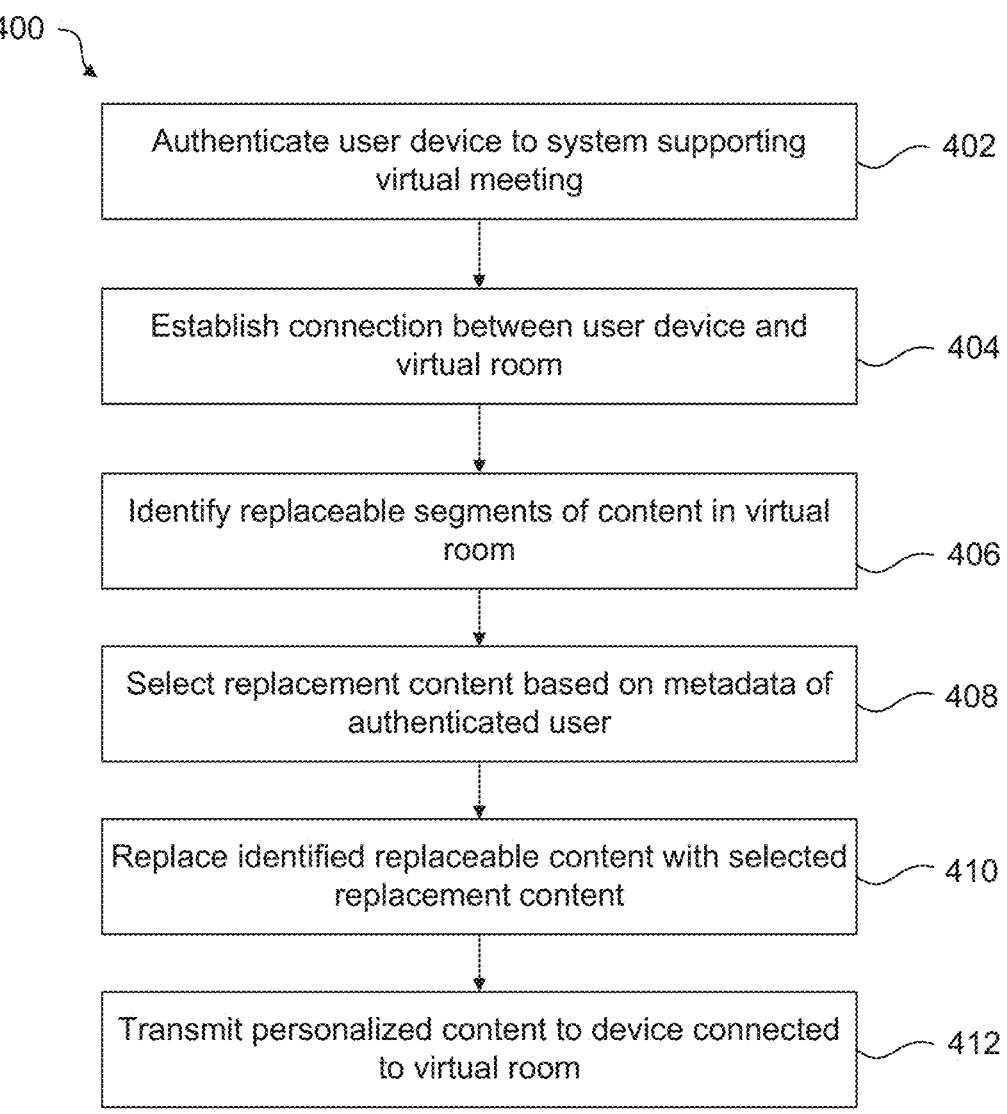
FIG. 4 illustrates an example process for personalizing content in a virtual meeting, in accordance with various embodiments.

Referring now to FIG. 4, process 400 is shown for delivering personalized content to authenticated users, in accordance with various embodiments. Process 400 may be executed by a computer-based system such as system 100 (of FIG. 1), though various embodiments may be executed on different systems.

Various embodiments of process 400 may include authenticating a user device to a system supporting a virtual meeting (Block 402). Authentication of process 400 may be completed using authentication techniques described above or other commonly known authentication techniques. Some embodiments may be authentication free and based on user opt in during connection to a virtual meeting. The virtual meeting system may support branding controls, time-based access schedules, and user permissions.

A connection may be established between the authenticated user device and a virtual room (Block 404) in some embodiments. The connection is an internet protocol connection in typical embodiments. The virtual room may include a virtual waiting room hosted during the session and prior to moving to a virtual meeting room. For example, a patient may check into a virtual doctor appointment using the authenticated user device. The authenticated device may be directed to a virtual waiting room until the doctor is ready or until the scheduled appointment time.

In various embodiments, the hosting system may identify replaceable segments of content in the virtual room (Block 406). Replaceable segments of content in the waiting room may include a blank screen, hold screen, hold music, generic content, branding, generic promotions, or other un-personalized content typically deliverable to waiting rooms. Replaceable content may also occur in the meeting room. For example, an attending physician in a virtual meeting with a patient may place a patient on hold, which automatically launches prerecorded content. The prerecorded content is replaceable for users that opt in and have preferences or metadata suitable for selecting replacement content. Replaceable content may be identified by virtual location or status such as, for example, being in virtual waiting room versus virtual meeting room. Replaceable content may also be identified based on the user being in an active meeting versus on hold. Some embodiments may flag content as replaceable during creation. System 100 may store replaceable content with a flag indicating replaceability. System 100 may also have a database of generic content that it treats as replaceable. The content provider may flag content as generic or as potential replacement content as the content is made available to the meeting system.

Various embodiments may select replacement content based on metadata associated with the authenticated user (Block 408). Metadata associated with an authenticated user can include meeting-relevant metadata such as, for example, user preferences, meeting type, meeting attendee characteristics, past meeting outcomes, projected attendee needs, metadata described above, or other metadata suitable for identifying replacement content for the account. Metadata may be stored in tags associated with the user account in some embodiments. For example, a user may enroll in personalized content when authenticating with the meeting system for a follow-up doctor appointment. The user account would include metadata indicating the user's request for content related to their appointment. The metadata may include information related to the patient's chart of past diagnoses and active prescriptions. The metadata may also include in identifier for the physical therapist's office and treating physicians. Metadata may also include replacement content identifiers to directly link a meeting attendee with a desired piece of content.

System 100 may use metadata associated with a user account to link an authenticated user account to personalized replacement content. Replacement content may be personalized to a particular user and associated user account. Replacement content related to a virtual physician appointment may include, for example, a list of reminders or instructions for medications, a personal message from a doctor, or a video clip of interest based on dietary suggestions. The user may opt into the personalized messages when logging into their virtual appointment, and the doctor or staff may suggest suitable replacement content by linking suitable replacement content directly to the user account. The doctor or staff may also assign metadata to potential replacement content allowing system 100 to compare metadata associated with potential replacement content to metadata associated with user accounts. System 100 may also automatically select replacement content from a library based on metadata or direct links in some embodiments.

Replacement content may be tagged with metadata on creation and introduction to the video meeting system. Continuing the above physical therapy example, the treating therapist may submit or select content in the video meeting system for transmission to patients in personalized unicasts or semi-unicasts. Content may be tagged with metadata in a manner similar to user accounts. Metadata associated with potential replacement content may include tags descriptive of content, content duration, suitable demographics of recipients, program enrollment, program preferences, characteristics of suitable recipients, or other metadata suitable for matching replacement content to an authenticated user account. Other conditions may also be considered in selecting replacement content such as, for example, expected time remaining in a waiting room, available duration for replacement, access permissions of the authenticated user, targeted branding controls, or other suitable considerations for selecting replacement content. Potential replacement contents may thus be tagged or otherwise associated with metadata to match user accounts that would be interested in the replacement content. In some embodiments, replacement content may be tagged with a user identifier associated with a particular user account to trigger delivery to the particular account associated with the user identifier. While tagging is used as an example, other techniques for matching characteristics may be effective in various embodiments.

Various embodiments may replace identified replaceable content with selected replacement content (Block 410). Replacement may occur server-side or at the connected user device. Selected replacement content may be written or transmitted to the device connected to the virtual room (Block 412).

Users consuming receive personalized content delivered using techniques described herein. The personalized content replaces generic content with content more likely to be of use to the user. The personalized content improves the user experience in consuming media and virtual meetings. In that regard, delivery of personalized content tends to improve user engagement in virtual meetings, which results in a more efficient use of the user's limited time.

Benefits, other advantages, and solutions to problems have been described herein regarding specific embodiments. Furthermore, the connecting lines shown in the various figures contained herein are intended to represent exemplary functional relationships or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

Moreover, where a phrase similar to "at least one of A, B, or C" is used, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. The exclusive or is intended only where the term "or" is used in conjunction with a term or phrase indicating exclusivity such as, for example, "either" or "only one of."

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant arts how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-based system comprising a processor in communication with a non-transitory, computer-readable medium configured to store instructions thereon that, when executed by the processor, cause the computer-based system to perform operations, the operations comprising:

hosting a virtual meeting room including content for a user account authenticated to a user device;

selecting replacement content by comparing first metadata of the replacement content with second metadata generated in response to a previous meeting with the user account;

replacing a segment in the content with the replacement content to generate personalized content; and transmitting the personalized content including the selected replacement content to the user device.

2. The computer-based system of claim 1, wherein the operations further comprise receiving the content from a content delivery network.

3. The computer-based system of claim 2, wherein the content comprises a primary segment and a secondary segment, wherein a cue indicates the secondary segment is replaceable.

4. The computer-based system of claim 1, wherein the replacement content comprises content related to a previously diagnosed condition of a user associated with the user account.

5. The computer-based system of claim 1, wherein a replaceable segment in the content comprises content for display in a waiting room of the virtual meeting room.

6. The computer-based system of claim 1, wherein the replacement content is selected in response to a unique identifier of the replacement content being associated with the user account.

7. The computer-based system of claim 1, wherein the operations further comprise authenticating the user device in response to receiving a request from the user device to join the virtual meeting room.

8. The computer-based system of claim 7, wherein the user device sends the request to join the virtual meeting room in response to executing a unique link.

9. A server comprising:

a processor;

a non-transitory, computer readable medium in communication with the processor and configured to store instructions thereon that, when executed by the processor, cause the server to perform operations, the operations comprising:

hosting a virtual meeting room including content for a user account authenticated to a user device;

selecting replacement content by comparing first metadata of potential replacement content with second metadata generated in response to a previous meeting with the user account;

replacing a segment in the content with the replacement content to generate personalized content; and transmitting the personalized content to the user device.

10. The server of claim 9, wherein a content delivery network transmits the personalized content to the user device.

11. The server of claim 9, wherein the content comprises a cue indicating the segment is replaceable.

12. The server of claim 11, wherein the user device requests the replacement content in response to detecting the cue.

13. The server of claim 9, wherein a replaceable segment in the content comprises an advertisement included in an original broadcast of the content.

14. The server of claim 9, wherein the replacement content is selected in response to a unique identifier of the replacement content being associated with the user account.

15. The server of claim 9, wherein the operations further comprise authenticating the user device in response receiving a request from the user account using the user device to communicate with the server.

16. A non-transitory, computer readable medium configured to store instructions thereon that, when executed by a computing device, cause the computing device to perform operations, the operations comprising:

hosting a virtual meeting room including content for a user account authenticated to a user device;

selecting replacement content by comparing first metadata of potential replacement content with second metadata generated in response to a previous meeting with the user account;

replacing a segment in the content with the replacement content to generate personalized content; and transmitting the personalized content to the user device.

17. The non-transitory, computer readable medium of claim 16, wherein the segment is identified as replaceable in response to being generic content for display in waiting rooms.

18. The non-transitory, computer readable medium of claim 16, wherein the replacement content is selected in response to a unique identifier of the replacement content being associated with the user account.

19. The non-transitory, computer readable medium of claim 16, wherein the operations further comprise authenticating the user device in response to receiving a request from the user device to join the virtual meeting room.

20. The non-transitory, computer readable medium of claim 19, wherein the user device sends the request to join the virtual meeting room in response to a unique link.

* * * * *